United States Patent [19]
Hanson

[11] 4,104,572
[45] Aug. 1, 1978

[54] SERVO SYSTEM TEMPORARY DESTABILIZATION CIRCUIT AND METHOD

[75] Inventor: Richard A. Hanson, Concord, Calif.

[73] Assignee: Systron-Donner Corporation, Concord, Calif.

[21] Appl. No.: 790,475

[22] Filed: Apr. 25, 1977

[51] Int. Cl.² ............................................. G05B 11/01
[52] U.S. Cl. ..................................... 318/631; 318/608
[58] Field of Search ................ 318/631, 608, 615, 621

[56] References Cited
U.S. PATENT DOCUMENTS

| | | | |
|---|---|---|---|
| 3,797,320 | 3/1974 | Clampitt | 318/631 X |
| 3,939,388 | 2/1976 | Abe et al. | 318/631 |
| 3,944,907 | 3/1976 | Weit | 318/631 |

*Primary Examiner*—B. Dobeck
*Attorney, Agent, or Firm*—Flehr, Hohbach, Test, Albritton & Herbert

[57] ABSTRACT

A servo system has a moving member supported for movement therein and a pickoff device for sensing the position of the moving member relative to a reference position. The pickoff provides a position output which is connected to an attenuator at the input of a high gain amplifier having a feedback loop for attaining gain stability. The feedback loop contains circuit components which provide stability in the servo system. An amplifier output attenuator reduces the feedback loop signal levels. Amplifier output is coupled to motive means for driving the moving member toward the reference position. A timing circuit produces a timed output which dissipates over a predetermined period of time. The timed output operates to enable a field effect transistor which causes the input divider to attenuate the position output to the high gain amplifier. An additional field effect transistor is enabled by the timed output and operates to temporarily remove the effect of the circuit components which provide servo system stability. A reduced frequency servo system oscillation results.

11 Claims, 9 Drawing Figures

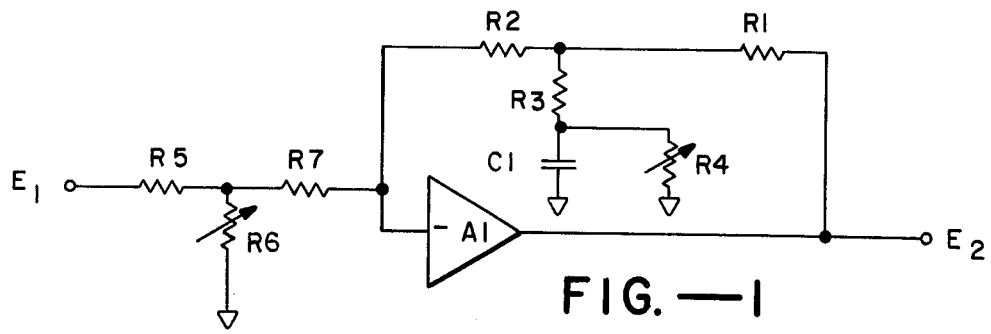
FIG.—1
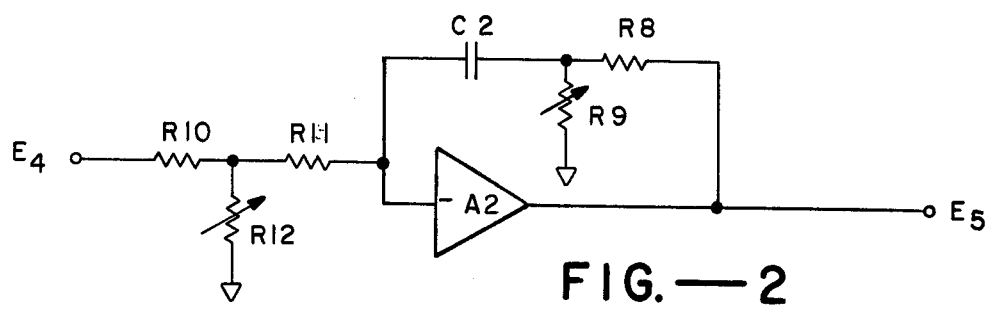
FIG.—2
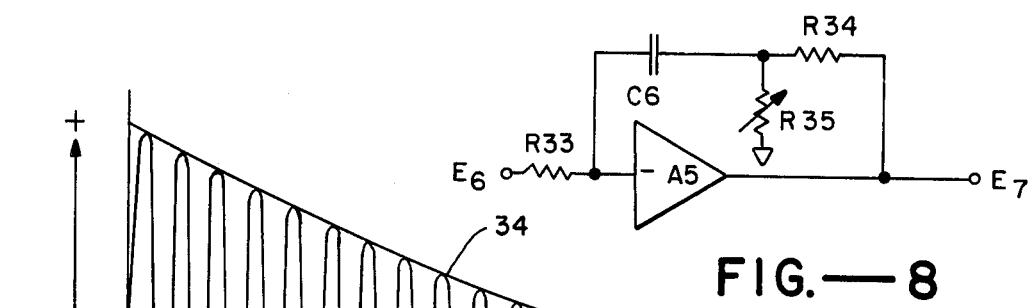
FIG.—8
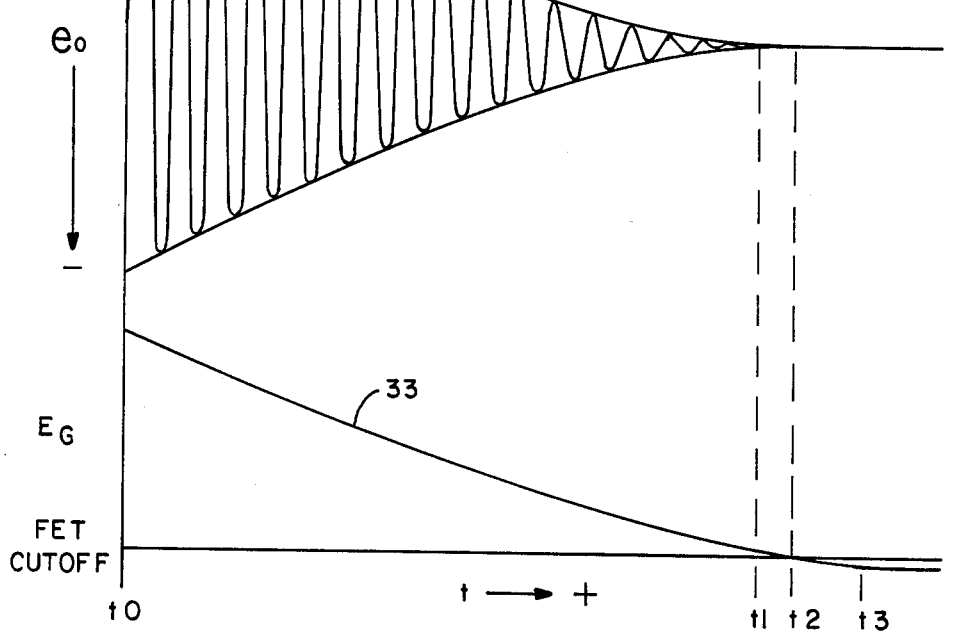
FIG.—7

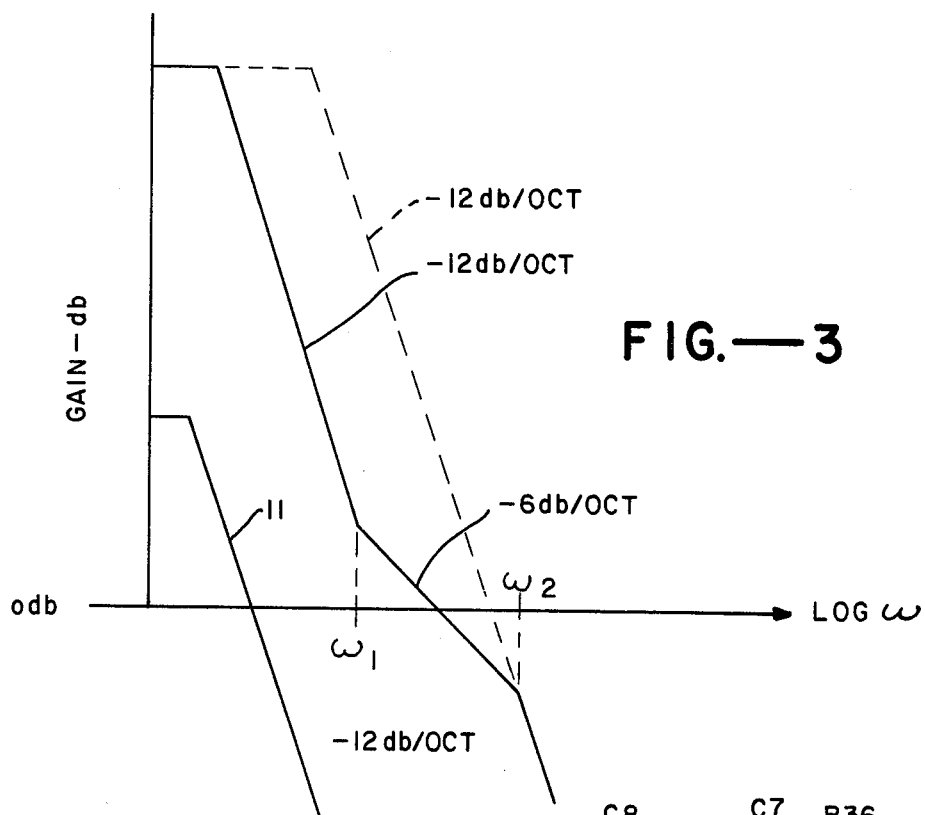
FIG.—3
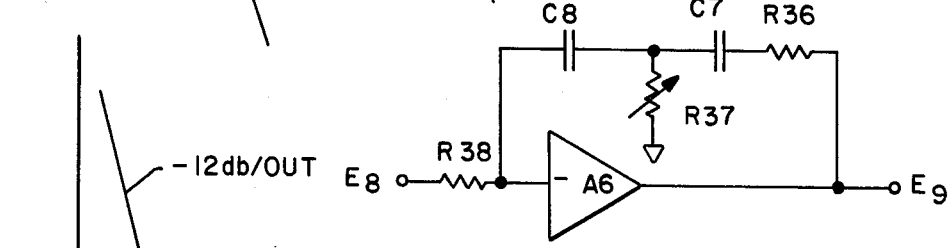
FIG.—9
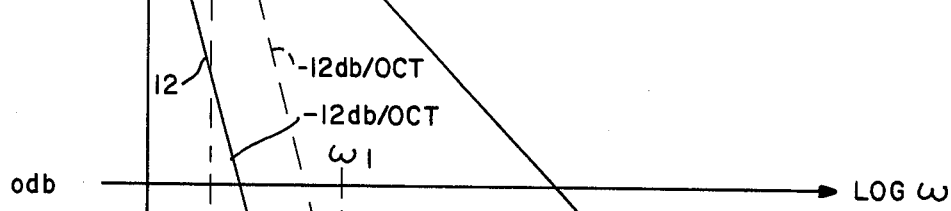
FIG.—4

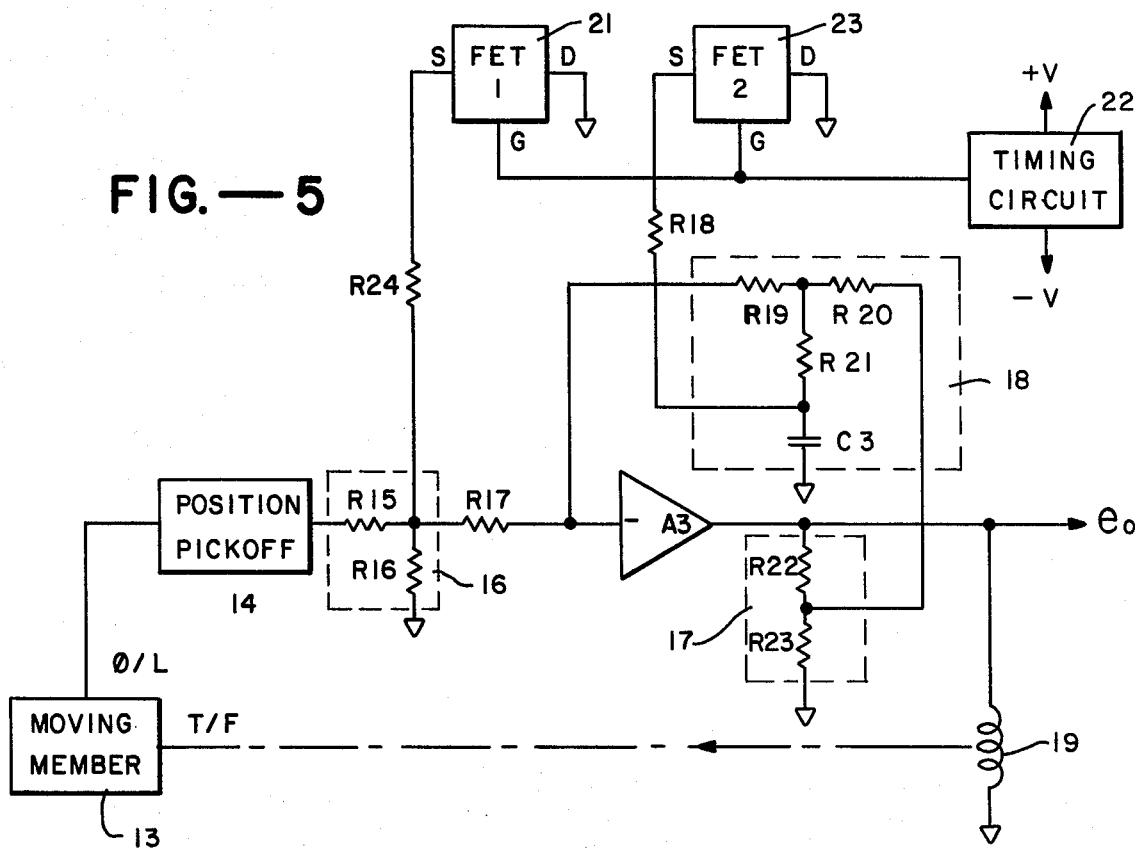
FIG.—5
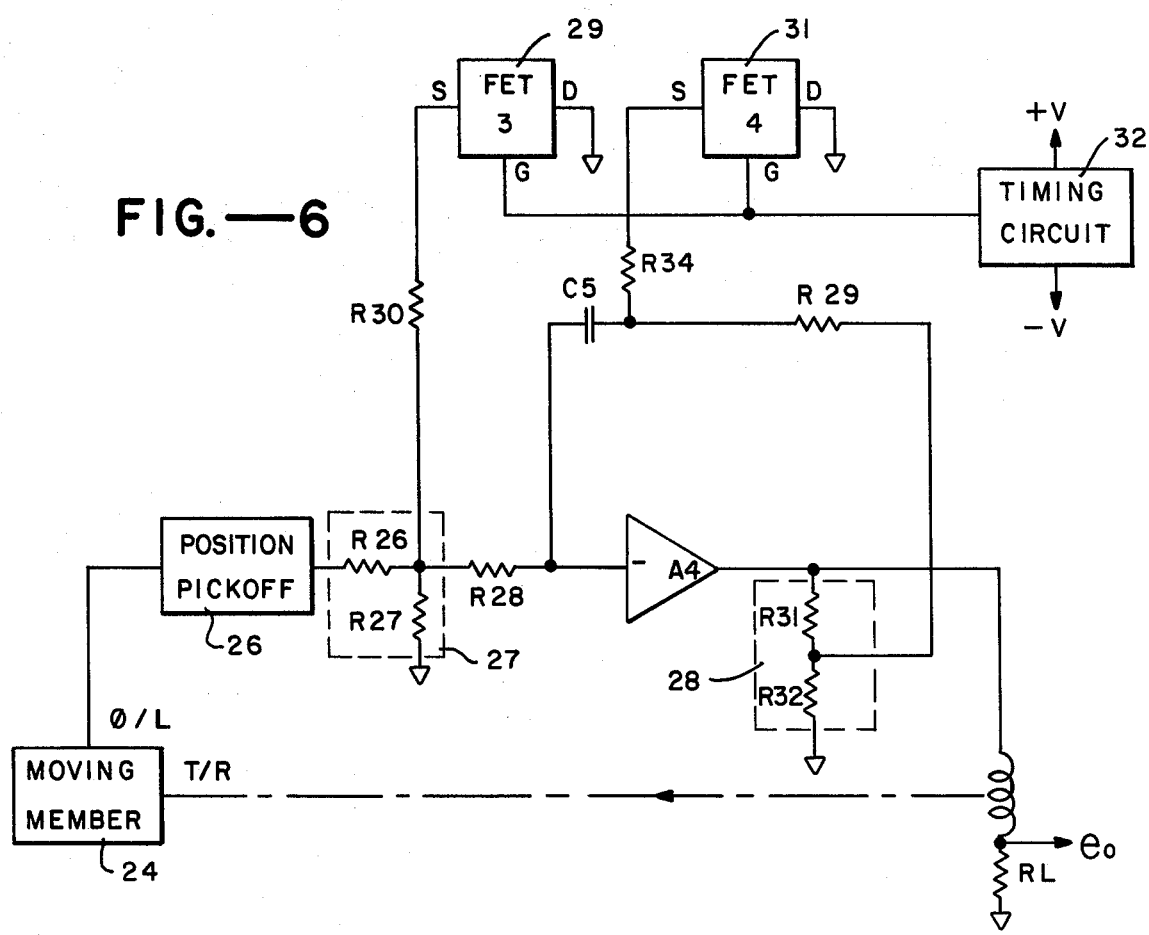
FIG.—6

SERVO SYSTEM TEMPORARY DESTABILIZATION CIRCUIT AND METHOD

BACKGROUND OF THE INVENTION

This invention relates to a circuit for de-stabilizing a servo loop, and more particularly to such a circuit for automatically adjusting servo loop gain during a programmed period of instability so that a sufficiently high amplitude, low frequency of oscillation may be obtained to which the servoed member in the servo loop will respond.

There are a number of circuits and methods for imposing what is termed "dither" in the servoed member of a servo loop for the purpose of removing zero "offset" resulting from the effect of static friction in the supports for the servoed member. One such apparatus and method is disclosed in U.S. Pat. No. 3,797,320 owned by the assignee in this application. The electronic dither circuit disclosed there destabilizes a servo loop allowing the servoed member to oscillate about a reference position by removing the damping in the servo loop through short-circuiting the feedback circuit which controls gain and which provides servo loop stability. The short circuit is obtained through the use of a photocell in conjunction with a light emitting diode. The light emitting diode is caused to emit light energy which impinges on the photocell, and thereby drives the resistance of the photocell towards a zero value. The light emitting diode is energized for a predetermined period of time by a timing circuit in response to a "start-up" signal. The disclosure of the above referenced patent mentions at column 6, lines 60 et seq., that the photo resistors serve as a variable control element and may be replaced by field effect transistors or other semi-conductor devices. As a matter of practical fact, it has been found that field effect transistors do not possess symmetrical resistance characteristics for large alternating voltage swings between the source and drain terminals when an enabling signal is present at the field effect transistor gate. As a consequence, field effect transistors, when turned on in place of the photocell, will provide unequal servo loop gain during servo loop oscillation, and will therefore tend to drive the moving or servoed member away from the reference position, thereby leaving a large zero offset at the end of the unstable period, which can be equal to or greater than the offset due to static friction which was to be removed by the oscillation.

A circuit is therefore necessary in which the circuit component utilized to impose the servo loop instability does not impart an asymmetrical amplitude to the servo moving member during oscillation or inject a potential zero offset error equal to or greater than that which was intended to be removed.

SUMMARY AND OBJECTS OF THE INVENTION

Disclosed herein is an electrical circuit used in combination with a closed loop servo system which includes a moving member disposed in a mechanical support, a position pickoff providing a signal indicative of the position of the moving member, an amplifier receiving the position pickoff signal, a motive means coupled to the amplifier output operating to reposition the moving member toward a reference position, and means for providing a phase lead or other damping in the servo system which stabilizes the system. The circuit operates to destabilize the servo system for a predetermined period of time, and includes a timing circuit providing a timer output signal having a predetermined decay time. Circuit components are positioned at the input of the amplifier to receive the position pickoff signal and to attenuate the pickoff signal during the predetermined decay time in response to the timer output. Servo loop gain is reduced thereby. Means are provided for substantially cancelling the phase lead during the predetermined period also in response to the timer output, whereby the servo system is unstable and oscillatory for the predetermined decay time. The reduced servo loop gain due to the attentuation of the position pickoff signal provides for a low servo system closure frequency which is below the normal response spectrum of the motive means and the moving member. The timer output signal dissipates gradually throughout the predetermined decay time. The resistance at the means for attentuating the position pickoff signal is usually lower than the resistance in the means for cancelling the phase lead. The result is that the servo loop gain starts low and increases before the servo restablizes due to reimposition of the phase lead. As a result the frequency of oscillation increases and the amplitude decreases throughout the predetermined decay time to firmly capture the moving member at the reference position at the end of the decay time, by returning the servo system gain to near normal before the servo completely restabilizes when the phase lead is fully restored. Thus, removal of static friction at servo system turn-on together with firm recapture of the servoed element at substantially zero offset is obtained.

In general, it is an object of the present invention to provide an electronic dither circuit which is less sensitive to temperature change and which operates to remove static friction in a shorter period of time.

Another object of the present invention is to provide an electronic dither circuit which separately operates to reduce servo loop gain and increase amplifier gain during dithering to thereby avoid potential amplifier instability at low gain/high bandwidth amplifier configurations.

Another object of the present invention is to provide an electronic dither circuit containing a minimum of components as well as components which are specifically suitable for micro-circuit construction.

Another object of the present invention is to provide an electronic dither circuit in which the servoed oscillation is symmetrical about a reference position and which is firmly captured at the end of the dither period.

Additional objects and features of the invention will appear in the following description in which the preferred embodiments are set forth in detail in conjunction with the accompanying drawings.

BRIEF DESCRIPTION OF THE DRAWINGS

FIG. 1 is a model circuit diagram of one embodiment of the destabilizing circuit.

FIG. 2 is a model circuit diagram of another embodiment of the destabilizing circuit.

FIG. 3 is a Bode assymptote diagram of the response characteristics of a servo system including the characteristics of the circuit of FIG. 1.

FIG. 4 is a Bode assymptote diagram of a servo system including the characteristics of the circuit of FIG. 2.

FIG. 5 is a block diagram of a servo system generally having the response characteristics of FIG. 3.

FIG. 6 is a block diagram of a servo system generally having the response characteristics of FIG. 4.

FIG. 7 is a timing diagram showing the timing output signal and the corresponding servo system output signal.

FIG. 8 is a model circuit diagram of an additional embodiment of the destabilizing circuit.

FIG. 9 is a model circuit of yet another embodiment of the destabilizing circuit.

DESCRIPTION OF THE PREFERRED EMBODIMENT

The circuit of FIG. 1 shows an input terminal at which a voltage E1 is impressed and an output terminal at which a voltage E2 is produced. An input divider consisting of resistors R5 and R6 is shown having a common point therebetween at which a voltage E3 is present. The resistor R6 is a variable resistor and may be varied between a value approaching zero ohms and a value approaching infinite resistance. Resistor R7 is coupled between the voltage divider and input of a high gain inverting amplifier A1. A "T" network consisting of resistors R1, R2, R3 and capacitor C1 is shown in a feedback loop between the output and input of high gain amplifier A1. Negative feedback is produced around high gain amplifier A1 for the purpose of obtaining gain stability and control. Capacitor C1 is paralleled by a variable resistor R4 which may be varied from a value approaching zero resistance to a value approaching infinite resistance.

When resistors R6 and R4 are varied simultaneously to assume a relatively low resistance value it may be seen that the input E3 to amplifier A1 is decreased and that capacitor C1 is essentially short-circuited by the shunt provided by resistor R4 at a very low resistance value. The closed loop gain of high gain amplifier A1 is increased due to the increase in feedback current from the amplifier output to supply the low resistance at R4, to keep the voltage drop across $R_2$ adequate to maintain the required summation of currents at zero at the amplifier input. Thus, a combination of results occurs as resistances R6 and R4 are driven toward zero resistance; (1) input to high gain amplifier A1 is attenuated and servo loop gain is decreased, (2) gain of high gain amplifier A1 is increased, (3) and leading phase term in output E2 as compared to input E1 is removed.

A simplified transfer function for the circuit of FIG. 1 is set forth below. The Circuit is analyzed only between the points E3 and E2 for simplication and clarity.

$$\frac{E2}{E3} = -\left(\frac{R1 + R2}{R7}\right)\left(1 + \frac{\tau_1 s}{\tau_2 s + 1}\right)$$

$$\text{WHERE: } \tau_1 = \frac{R1 \cdot R2 \cdot C1}{R1 + R2} = \frac{1}{\omega_1}$$

$$\tau_2 = R3\,C1 = \frac{1}{\omega_2}$$

When a circuit represented by the model circuit of FIG. 1 is inserted between a pickoff producing a position output signal and motive means receiving the amplifier output and functioning to urge moving member toward a reference position, which is sensed by a pickoff means, the system response is represented by the Bode assymptotes of FIG. 3. When variable resistance R4 and R6 are virtually infinite in value, a 12 db per octave response assymptote is seen to extend out to the corner frequency $\omega_1$. The 12 db roll-off in response in the servo system to $\omega_1$ is caused by the inertia terms in the motive means and moving member in the servo system. Between the frequencies $\omega_1$ and $\omega_2$ a servo system response roll-off at 6 db per octave is seen which is obtained from an electrical lead term network such as that shown in FIG. 1 provided by the T network in the feedback path around high gain amplifier A1. When variable resistance R4 is dirven toward a zero resistance value, the zero in the Bode assymptote diagram of FIG. 3 at $\omega_1$ is removed and the gain at amplifier A1 is increased as seen by the dashed assymptote line marked minus 12 db per octave. The frequency sensitive component in the T network in the feedback path around amplifier A1 having been removed, servo system response at increased servo loop gain continues to roll off at 12 db per octave. Simultaneous reduction of variable resistance R6 toward zero attentuates the input to high gain amplifier A1 and thereby reduces servo loop gain providing the Bode assymptote seen in FIG. 3 at 11. Therefore, the servo system response is defined by assymptotes 11 when resistances R6 and R4 are at a near zero value, returning to the −12 db and −6 db characteristics when R6 and R4 are restored to near resistance value. A condition of instability will result with 180° servo gain term phase shift (−12 db per octave) and unity gain (zero db). This condition may be seen to exist on the assymtote 11, and the servo system will oscillate.

In FIG. 2 an alternative embodiment of the destabilization circuit disclosed herein is shown. An input E4 is impressed at the circuit input, and an output E5 is provided at the output of a high gain inverting amplifier A2. An input divider couples the input E4 to the input of high gain amplifier A2. The input divider includes resistor R10 and variable resistance R12 having a common node therebetween at which a signal level E6 exists. An input resistance R11 is connected to the inverting input of amplifier A2, and a negative feedback path is provided between the output and the input thereof including resistance R8 and capacitor C2 in series, and a variable resistance R9 connected between a point common to resistor R8 and capacitor C2 and a reference potential. As explained for FIG. 1 above, when resistance R12 is varied toward a zero resistance value, input is attenuated to a lower value at the input of high gain amplifier A2. When variable resistance R9 is driven toward a zero resistance value, both terminals on capacitor C2 are virtually at DC ground reference. Impedance at capacitor C2 is low for high frequency and the AC potential across C2 and therefore C9 is low. Therefore AC feedback path current is minimally affected by driving R9 to a low resistance, and gain in amplifier A2 is also minimally affected.

As in the explanation of the operation of the circuit of FIG. 1 above, the explanation for the operation of FIG. 2 will be assumed to be in conjunction with a servo system including a moving member, a position pickoff for the moving member providing a position output E4 to the input divider including resistors R10 and R12, motive means receiving the output E5 from high gain amplifier A2 and driving the moving member toward a reference position. Transfer function analysis of the circuit of FIG. 2 between point E6 and E5, for purposes of simplification as explained above, is computed to be the following:

$$\frac{E5}{E6} = -\frac{R8}{R11}\left(\frac{\tau_1 s + 1}{\tau_1 s} + \frac{1}{\tau_2 s}\right)$$

where:
$\tau_1 = R9C2 = 1/\omega_1$
$\tau_2 = R8C2 = 1/\omega_2$

It may be seen that the above converts to the following for variable resistance R9 approaching infinity:

$$\frac{E5}{E6} = -\frac{R8}{R11}\left(\frac{\tau_2 s + 1}{\tau_2 s}\right)$$

Conversely when variable resistance R9 approaches a zero value the transfer function E5/E6 assumes the following form:

$$\frac{E5}{E6} = -\frac{R8}{R11}\left(\frac{\tau_1 s + 1}{\tau_1 s}\right)$$

Turning to FIG. 4 a chart of the Bode assymptotes for a servo system as described above including the circuit of FIG. 2 is shown, wherein an initial servo system response roll-off of 12 db per octave occurs due to the mechanical inertia terms in the servo system. Beginning at the corner frequency $\omega_2$ of FIG. 4 a minus 6 db per octave system response assymptote is seen, which occurs due to either servo mechanism mechanical damping or an electrical lead term imposed in the servo loop. When variable resistance R9 is driven toward a zero resistance value the phase lag of the servo system in which it is contained is driven out to a frequency $\omega_1$ as seen in FIG. 4 and the minus 12 db per octave assymptote shown as a dashed line is seen to cross the zero db level. When resistor R12 is driven toward the zero resistance value, the servo loop gain is reduced and the servo system response assymptotes are seen to be shifted to a lower frequency in FIG. 4 as represented by minus 12 db per octave assymptote 12. Instability of the servo system clearly occurs, as the minus 12 db per octave (minus 180° phase shift) assymptote crosses the zero db (unity gain) level.

In FIG. 5 a typical closed loop servo system is shown having a moving member 13 which may move in angular motion or rectilinear motion as signified by $\theta/L$. The position of moving member 13 is sensed by a position pickoff 14 which provides a position output. The position output is connected to an input divider 16 including resistors R15 and R16 which is coupled through resistor R17 to the input of high gain inverting amplifier A3. An output divider 17 is coupled to the output of high gain amplifier A3 including resistors R22 and R23. The divided output from amplifier A3 is connected to a feedback path between the output and the input of amplifier A3 which includes a phase lead "T" network 18. Resistors R 19, R20, R21 and capacitor C3 are included in phase lead network 18. The output from high gain amplifier A3 is directed to a torquer or a force producing element 19 which operates to reposition moving member 13 toward a reference position.

A "washout" resistor R24 is connected to the circuit node between R15 and R16 in input divider 16 and is connected to the source of a field effect transistor (FET) 21. The drain of FET 21 is connected to ground reference. The gate of FET 21 is connected to receive a timed output from a time circuit 22. Capacitor C3 in phase lead network 18 is paralleled by resistor R18 in series with a second field effect transistor 23 having a gate also connected to receive the timed output from timing circuit 22. The timed output is an exponentially decaying pulse extending over a predetermined decay time and dissipating to a zero reference within the predetermined decay time. The timing pulse enables FETS 21 and 23 for a period of time within the predetermined dwell time.

The purpose of the input divider 16 is to reduce the source to drain voltage across FET 21 so that alternating signals between the source and drain are at a low enough level to provide symmetrical resistance values between source and drain for symmetrical alternating voltage levels applied therebetween. Washout resistor R24 is provided to mask any small assymmetry in source to drain resistance values obtained for reverse polarity voltage signals between source and drain having the same voltage level. Output divider 17 has a similar purpose, together with resistors R20 and R21, of reducing the source to drain voltage level at FET 23, so that source to drain resistance values will be the same for opposite polarity voltage signals alternately impressed between the source and drain of FET 23 when it is turned on by the timed output enabling signal from timing signal 22.

It may be seen that when the timed output from timing circuit 22 enables both FETS 21 and 23, the servo system of FIG. 5 functions similarly to that described in conjunction with FIG. 1 above. The Bode assymptotes of FIG. 3 therefore describe the response characteristics for the servo system of FIG. 5. In summary, when timed output is connected to the gates of FETS 21 and 23, the position output is reduced in level at the input of high gain amplifier A3 thus reducing servo loop gain. Simultaneously the phase lead normally introduced by phase lead network 18 is removed from the servo loop and the servo loop is unstable and oscillatory. Timed output dissipates throughout the predetermined decay time, much as an exponentially decaying signal, and the gain of the servo loop is gradually restored throughout the predetermined dwell of the timed output as resistance is increased between source and drain in FET 21. The frequency of oscillation for the servo system rises as the servo loop gain increases before phase lead is restored by the rising resistance between source and drain in FET 23 as timed output dissipates through the predetermined dwell period. Consequently, oscillation of moving member 13 is relatively symmetrical about the reference position. Near the end of the predetermined decay time the moving member is captured firmly by the increased servo loop gain prior to reimposition of phase lead and subsequent servo loop stability following the predetermined decay time.

FIG. 6 shows a block diagram for a servo system utilizing the destabilizing circuitry of FIG. 2. A moving member 24 is disposed for motion either through an angle $\theta$ or a rectilinear distance L. The angular or rectilinear position of moving member 24 is sensed by a position pickoff 26 which produces a position output. An input divider 27 includes resistors R26 and R27, being coupled through input resistor R28 to the input of a high gain inverting amplifier A4. In the variation of this configuration seen in FIG. 8 using a low gain amplifier, this divider is, as will be explained hereinafter, not required. An output divider produces a dividied output between component divider resistors R31 and R32 to a feedback loop providing negative feedback between the output and the input of high gain amplifier A4. A feedback resistor R29 is located in the feedback loop together with a series capacitor C5.

A "washout" resistor R30 is connected to input divider at the node between the gain divider resistors R26 and R27 in series with the source and drain of a field effect transistor (FET) 31 in the configuration of FIG. 6 is connected through resistor R34 to the common node between capacitor C5 and resistor R29. A timing circuit 32 produces a timed output having a predetermined decay time which is connected to the gates of FETS 29 and 31. The embodiment of FIG. 6 has phase lead imposed in the servo loop either through a phase lead network in the feedback path for high gain amplifier A4, or alternatively, fluid damping may be imposed on the moving member 24 within the servo loop to provide for the required phase lead in the servo loop for servo stability.

It should be noted that the washout resistors R24 and R18 of FIG. 5 and R30 and R34 of FIG. 6 would not be required in one special case. Such a case exists when the other resistance values in the circuit and the "on" resistance of the FETS have values such that the FET is effectively in the circuit only while the FET drain to source resistance is close to the totally "on" value. It would, however, be a tedious task to select FETS for such a special case due to other desirable FET characteristics, such as high pinch-off voltage for noise immunity, for example.

The manner in which the servo system of FIG. 6 operates involves timing circuit 32 initially providing the timed output to the gates of FETS 29 and 31 to reduce the input to high gain amplifier A4, and to effectively cancel phase lead, add phase lag, or extend the lag corner to a higher frequency, as seen in the Bode assymptotes in the diagram of FIG. 4, depending upon the means by which servo loop stability is obtained during normal operation. As a result, the servo system assumes an unstable condition during the predetermined dwell time of timing output from timing circuit 32, and servo loop gain is decreased by the position output division at the input to high gain amplifier A4. The low voltage swing range at the input divider junction coupled to the source of FET 29 provides symmetrical source to drain resistance variation for symmetrical source to drain voltage variation. The voltage swing across the servo amplifier feedback network is as much as two orders of magnitude greater than that voltage swing allowable between drain and source which provides symmetrical source to drain resistance variation for symmetrical source to drain voltage variation at FET 31. The voltage swing across FET 31 is maintained at the acceptable low level by the voltage division at output divider 28 and by connecting FET 31 on the amplifier junction side of R29. The input divider 27 further provides the advantage of requiring more gain across the high gain amplifier A4. At low gain the high gain amplifier A4 could have a closed loop band width which extends to very high frequencies, and the high gain amplifier could itself become unstable due to phase lag introduced by stray capacitance at the high frequencies. Instability in the high gain amplifier would degrade the oscillation symmetry in the moving member in the servo loop. An input divider would not normally be found at the input to the high gain operational amplifier, because it would reduce servo gain and degrade the signal to noise ratio through servo gain and degrade the signal to noise ratio through the amplifier. Therefore, the use of two separate FETS in two distinct places in the circuit provides temporary servo system instability in response to a dissipating timed output, which maintains the servo oscillation or "dither" symmetrically about a reference position, and therefore affords the advantage of high gain amplifier stability during dither and desirable signal to noise ratio at the amplifier during normal system operation.

FIG. 7 shows the timed output 33 from timing circuit 22 and 32. Timed output 33 has a predetermined dwell time $t3$ minus $t0$. FETS 21, 23, 29 and 31 are effectively out of the circuits within the predetermined dwell time at time $t2$. Stability is reached in the servo loop at time $t1$. Output $e0$ from high gain amplifier A3 and A4 is shown as oscillating level 34 which decreases in amplitude and increases in frequency from time $t0$ to time $t1$. The symmetry attained in oscillating output 34 is made possible by the symmetrical source to drain resistance relationship as a function of symmetrical source to drain voltage alternation at low source to drain voltage swing. The form of oscillating output 34 is virtually insensitive to temperature variation, and the time $t1$ minus $t0$ is extremely short, being well under one second for some applications.

A variation of the circuit of FIG. 2 is shown in FIG. 8. Use of a relatively low gain inverting very high input impedance amplifier A5, would not require the input divider compound of R10 and R12 in FIG. 2. The single variable resistor R35 would both reduce gain and extend the phase lag corner frequency. The Bode assymptotes would be similar to those of FIG. 4. The gain is lowered because with a low operating gain, the inverting (input) junction will not stay at virtual ground. With a lower gain the input amplifier A5 must swing further away from ground reference to provide a given output voltage. Additionally at higher frequencies, as the impedance of C6 approaches zero, the node between R34 and R35 is short circuited to the inverting (input) junction. Since the low value of R35 is typically very small relative to R34, a significant amount of the current coming through R33 is shunted through R35 to ground, even though the voltage across R35 produced by the inverting (input) junction voltage is small compared to the voltage across R34. Since less current flows through R34, the voltage at the output E7 is reduced for a given input voltage E6 and thus, the gain is reduced.

In cases where the input signal to the servo amplifier is of high amplitude, or where noise is an important factor, the circuit of FIG. 8 may not provide sufficiently low gain during destabilizing and still provide sufficiently high gain during normal servo operation. In such a case the circuit of FIG. 9, which adds lag for servo destabilization, may be used. The circuit of FIG. 9 is also useful when there is a double servo lead term which must be cancelled to provide the period of destabilization or dither at a frequency to which the servoed mechanical components will respond.

The following transfer function is descriptive of the circuit of FIG. 9.

$$\frac{E9}{E8} = -\left[\frac{1}{\tau_o s} + \left(\frac{\tau_1 + 1}{\tau_1 s}\right)\left(\frac{\tau_3 s + 1}{\tau_2 s}\right)\right]$$

where:

$$\tau_0 = C8R38 = 1/\omega_0$$
$$\tau_1 = C8R37 = 1/\omega_1$$
$$\tau_2 = C7R38 = 1/\omega_2$$
$$\tau_3 = C7R36 = 1/\omega_3$$

As may be seen from reference to the above transfer function and FIG. 9, during the destabilization period $t_0$ to $t_1$ of FIG. 7, the resistance R37 goes to a low resistance value, and all of the terms of the transfer function are operative. There is a product of two lag terms, denominator factors $\tau_1$ and $\tau_2$, which yields an increase in the Bode assymptote rolloff of 6 db per octave. As a consequence the Bode assymptote passes through the zero db point in the appropriate Bode diagram at a lower frequency when R37 approaches zero resistance value. The effect is essentially that of lowering the gain of amplifier A6 and therefore of the servoed loop. The circuit of FIG. 9 therefore functions as do the circuits of FIGS. 2 and 8 to cause servo destabilization during the predetermined decay time.

After the predetermined decay time, as resistance R37 approaches an infinite value the transfer function term including $\tau_1$ approach unity value. The Bode assymptote crossed the zero db point in the appropriate diagram at a higher frequency, and the normal "tight" servo loop gain is restabilized. Capacitors C8 and C7 present a single combined capacitance value to effect the dynamic behavior of the servo loop when R37 approaches infinite value.

What is claimed is:

1. An electrical apparatus for reducing static friction in a mechanical bearing assembly disposed in a housing, which supports a moving member for rotational movement about a pivot axis extending through the mechanical bearing assembly, comprising
    means for urging said moving member toward a reference position about the pivot axis,
    a position pickoff for providing a position signal indicative of the rotational position of the moving member relative to said reference position,
    an amplifier coupled between said position pickoff and said means for urging and having an output and an input, said means for urging, position pickoff, and amplifier thereby forming a servo loop,
    a feedback circuit coupled between said amplifier output and input,
    means for damping said servo loop disposed in said feedback circuit,
    an input divider coupled between said position pickoff and said amplifier input operating to attenuate the input to said amplifier when one leg of said divider is shunted,
    a first field effect transistor connected to shunt said means for damping when conducting,
    a second field effect transistor connected to shunt said one leg of said input divider so that the gain of said loop is attenuated,
    and a timing circuit for enabling said first and second field effect transistors to conduct for a predetermined period of time,
    so that when said first and second field effect transistors are enabled by said timing circuit phase lag through said servo loop is increased to more than 180°, thereby producing instability in said servo loop and a substantially symmetrical oscillatory motion of the moving member about said reference position.

2. An electrical apparatus as in claim 1 together with an output divider coupled between said amplifier output and said feedback circuit, whereby peak oscillatory drain to source voltage at said first field effect transistor is reduced to a low level and the corresponding drain to source resistance variation is symmetrical with said oscillatory output.

3. An electrical apparatus as in claim 1 wherein said timing circuit provides an enabling output pulse which dissipates in said predetermined period of time, whereby phase lag and servo loop gain attentuation is gradually removed during said predetermined period of time, said gain attenuation being removed before said phase lag, whereby the frequency of said oscillatory motion of said moving member is increased during said predetermined period of time and said moving member is captured more tightly at the end thereof.

4. In combination with a closed loop servo system having a moving member disposed in a mechanical support, a position pickoff providing a signal indicative of the moving member position, an amplifier receiving the position pickoff signal, motive means coupled to the amplifier output and operating to reposition the moving member to a reference position, and means for providing a phase lead in the servo loop sufficient to provide servo system stability,
    an electrical circuit operating to destabilize the servo system, comprising
    a timing circuit providing a timer output signal with a predetermined dwell time,
    means for attenuating said position pickoff signal being actuated by said timer output, whereby servo loop gain is reduced,
    means for inducing phase lag and substantially cancelling the phase lead in response to timer output, whereby the servo system is unstable and oscillatory for said predetermined dwell time, and said reduced servo loop gain provides for a low servo system closure frequency which is within the response spectrum of said motive means and moving member, such oscillation of the moving member removing static friction from the mechanical support therefor.

5. The combination of claim 4 wherein the amplifier is a high gain amplifier with negative feedback for gain stability and control, said means for inducing phase lag and substantially cancelling the phase lead comprising a field effect transistor coupled to receive the amplifier feedback, said field effect transistor having a gate, source and drain, with said timer output connected to said gate, and means for voltage is maintained within a low voltage range and resistance between source and drain is symmetrical with symmetrical alternating source to drain voltage.

6. The combination of claim 4 wherein said means for attenuating said position pickoff signal is a voltage divider, having a first leg coupled to said position pickoff signal and a second leg coupled to the amplifier input, a field effect transistor having a gate source and drain with source and drain connected to shunt said second leg when said timer output is connectd to said gate, whereby drain to source voltage is maintained within a low voltage range and resistance between drain and source is substantially symmetrical with symmetrical alternating drain to source voltage, so that oscillation of the moving member about the reference position is substantially symmetrical.

7. An electronic circuit for destabilizing a servo loop for a predetermined period of time, wherein the servo loop includes a moving member, a pickoff sensing the position of the moving member and providing position indicative output, an amplifier, a feedback circuit connected to the amplifier providing servo loop gain stability and control, motive means coupled to the amplifier output and urging the moving member toward a reference position, comprising means for providing a timing output having an output level gradually dissipating over the predetermined period of time, an input attentuator connected between the pickoff and the amplifier, a first field effect transistor controlled between an on and an off condition connected to said input attentuator and having a gate, source and drain, with said gate connected to receive said timing output, said input attentuator operating to reduce position indicative output coupled to the amplifier when said first field effect transistor is controlled to an on condition within the predetermined period of time, a second field effect transistor controlled between an on and an off condition connected to the feedback circuit, having a gate, source and drain, with said gate connected to receive said timing output, and operating to remove the servo loop gain stability when controlled to the on condition, and means for reducing the drain to source voltage swing at said second field effect transistor, whereby resistance between drain and source in both siad first and second field effect transistors is substantially symmetrical with symmetrical alternating voltage therebetween, and a dissipating oscillatory motion having substantially equal amplitude on each side of the reference position is induced in the moving member, which oscillatory motion is reduced to zero within the predetermined period.

8. An electronic circuit for temporarily reducing phase lead at an output relative to an input, comprising an amplifier having an input and an output, a feedback circuit between said input and output, phase lead components in said feedback circuit operating to impose phase lead at the output, means for attenuating the feedback, a field effect transistor having a gate, source and drain connected to receive the attentuated feedback at the source thereof, said field effect transistor operating to shunt said phase lead components when conducting between source and drain, said means for attenuating providing a low source drain voltage at said field effect transistor, and a timing circuit providing a timed output pulse having a predetermined dwell time connected to said gate, so that said field effect transistor conducts for said predetermined dwell time.

9. A method for oscillating a moving member contained in a servo loop in mechanical supports at an oscillatory frequency about a reference position to thereby reduce static friction in the supports, comprising the steps of sensing the position of the moving member and obtaining an output indicative thereof, attentuating the output and therefore the servo loop gain so that the oscillatory frequency is within the response band of the moving member, amplifying the attenuated output and obtaining an amplified output, removing phase lead from the amplified output until the servo loop is destabilized, urging the moving member to oscillate about the reference position with the amplified output with phase lead removed, and limiting in time the steps of attentuating the output and removing phase lead so that the servo loop restabilizes thereafter.

10. A method of inducing oscillatory motion about a reference position in a moving member in a servo system having motive means for moving the moving member and containing components introducing phase lead in the servo system for the purpose of stabilization, comprising the steps of sensing the position of the moving member and obtaining an output indicative thereof, amplifying the output, driving the motive means with the amplified output, attenuating the amplified output, bypassing the phase lead components with a field effect transistor, connecting the attenuated output to the source of the field effect transistor, turning the field effect transistor on, thereby destabilizing the servo system by removing phase lead and obtaining substantially symmetrical oscillatory motion in the moving member due to substantially symmetrical field effect transistor source to drain resistance variation for symmetrical alternating attentuated output therebetween, and limiting the time the field effect transistor is turned on so that the servo system restabilizes thereafter.

11. An electronic circuit for use in a servo system operating to temporarily reduce servo system gain and phase lead and to therefore destabilize a servoed member, comprising an amplifier, a feedback path around the amplifier, electronic circuit components in said feedback path providing phase lead in the servo system, an attentuator reducing the signal in the feedback path, a field effect transistor having a gate, source and drain with the source connected to receive the attenuated feedback signal, said field effect transistor operating to bypass said electronic circuit components when conducting between source and drain and to reduce servo gain, a timing circuit providing a decaying output signal connected to said gate causing substantially symmetrical conduction between said source and drain for symmetrical alternating attentuated signal therebetween, said servo system gain thereby increasing as said decaying output signal decreases, whereby the servo system is destabilized during the duration of the decaying output signal and the servoed member oscillates substantially symmetrically about the reference position.

* * * * *